US011780040B2

(12) United States Patent
Sano et al.

(10) Patent No.: US 11,780,040 B2
(45) Date of Patent: Oct. 10, 2023

(54) MACHINE TOOL

(71) Applicant: MAKINO MILLING MACHINE CO., LTD., Tokyo (JP)

(72) Inventors: Yuji Sano, Yamanashi (JP); Masatoshi Sakamoto, Yamanashi (JP); Toru Nakashima, Yamanashi (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 343 days.

(21) Appl. No.: 17/289,853

(22) PCT Filed: Oct. 31, 2018

(86) PCT No.: PCT/JP2018/040596
§ 371 (c)(1),
(2) Date: Apr. 29, 2021

(87) PCT Pub. No.: WO2020/090055
PCT Pub. Date: May 7, 2020

(65) Prior Publication Data
US 2021/0402541 A1 Dec. 30, 2021

(51) Int. Cl.
*B23Q 3/157* (2006.01)
*B23Q 11/08* (2006.01)
(Continued)

(52) U.S. Cl.
CPC ..... *B23Q 3/15773* (2013.01); *B23Q 3/15722* (2016.11); *B23Q 3/15746* (2013.01);
(Continued)

(58) Field of Classification Search
CPC ... Y10T 409/30392; Y10T 409/401925; Y10T 483/115; Y10T 483/1748; Y10T 483/1752;
(Continued)

(56) References Cited

U.S. PATENT DOCUMENTS 5,224,916 A * 7/1993 Chang ............... F16P 3/006
74/612
5,353,823 A * 10/1994 Peter ............... B23Q 11/0042
134/182
(Continued)

FOREIGN PATENT DOCUMENTS

| CN | 106475847 A | * | 3/2017 |
| JP | H4-13234 U | | 2/1992 |

(Continued)

OTHER PUBLICATIONS

International Search Report and Written Opinion, dated May 2, 2019, directed to International Application No. PCT/JP2018/040596; 24 pages.

*Primary Examiner* — Sunil K Singh
*Assistant Examiner* — Michael Vitale
(74) *Attorney, Agent, or Firm* — MORRISON & FOERSTER LLP

(57) ABSTRACT

This machine tool is provided with an arm for exchanging a tool between a main shaft in a machining chamber and a secondary tool standby position in a tool holding chamber, a shutter which is provided in an opening defined in a wall which partitions between the machining chamber and the tool holding chamber, a first motor for opening and closing the shutter, a shutter position detector which can detect the position of the shutter in the entire range between the fully open position and the fully closed position, a storage device which stores a prescribed position of the shutter associated with a prescribed operation of the arm and a control device which is configured to perform a prescribed operation of the arm on the basis of the position of the shutter detected by the shutter position detector and the prescribed position of the shutter stored in the storage device.

6 Claims, 17 Drawing Sheets

(51) Int. Cl.
*B23Q 11/00* (2006.01)
*B23Q 3/155* (2006.01)

(52) U.S. Cl.
CPC ........ *B23Q 11/005* (2013.01); *B23Q 11/0891* (2013.01); *B23Q 2003/15532* (2016.11); *Y10T 483/115* (2015.01); *Y10T 483/176* (2015.01); *Y10T 483/1864* (2015.01); *Y10T 483/1882* (2015.01)

(58) Field of Classification Search
CPC ......... Y10T 483/1755; Y10T 483/1757; Y10T 483/176; Y10T 483/1767; B23Q 3/15713; B23Q 3/15773; B23Q 11/0891; B23Q 2003/15532
USPC ........ 483/3, 36, 38, 39, 40, 41, 44; 409/134, 409/254
See application file for complete search history.

(56) References Cited

U.S. PATENT DOCUMENTS

| | | | | |
|---|---|---|---|---|
| 6,059,702 | A * | 5/2000 | Winkler | B23Q 3/157 |
| | | | | 409/137 |
| 6,203,479 | B1 * | 3/2001 | Gengo | B23Q 3/15526 |
| | | | | 483/62 |
| 7,033,308 | B2 * | 4/2006 | Fujimoto | B23Q 3/15706 |
| | | | | 409/137 |
| 10,434,612 | B2 * | 10/2019 | Toyama | B23Q 11/0841 |
| 2007/0078043 | A1 * | 4/2007 | Yoshida | B23Q 11/0891 |
| | | | | 483/3 |
| 2016/0193706 | A1 * | 7/2016 | Kanda | B23Q 3/1554 |
| | | | | 483/58 |
| 2019/0001453 | A1 * | 1/2019 | Ishikawa | B23Q 11/0883 |

FOREIGN PATENT DOCUMENTS

| | | |
|---|---|---|
| JP | H07-60596 A | 3/1995 |
| JP | H08-4989 Y2 | 2/1996 |
| JP | 2007-30062 A | 2/2007 |
| JP | 2010-228063 A | 10/2010 |
| KR | 101450886 B1 * | 10/2014 |

* cited by examiner

F I G. 6
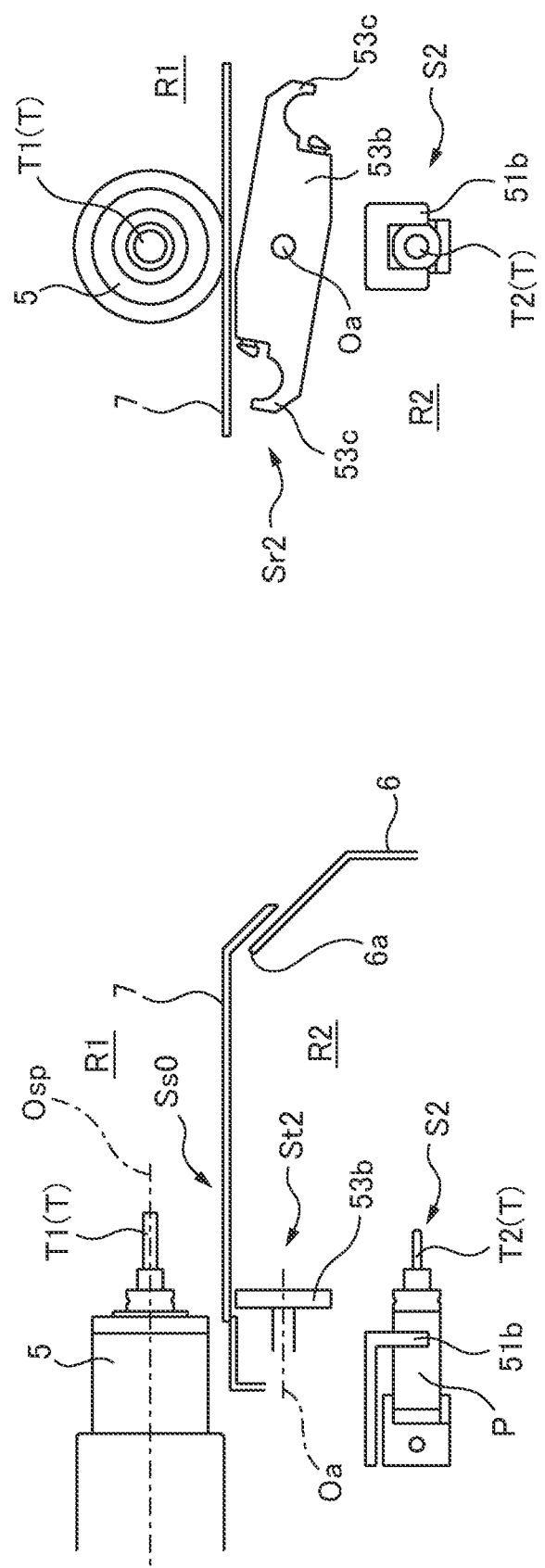

FIG. 11
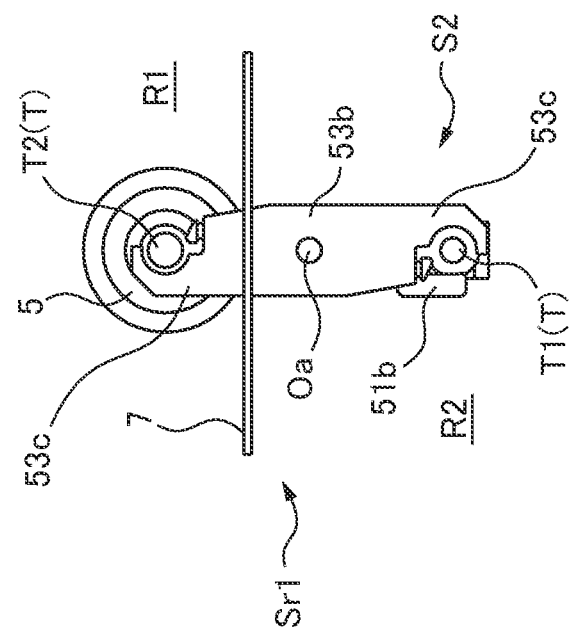
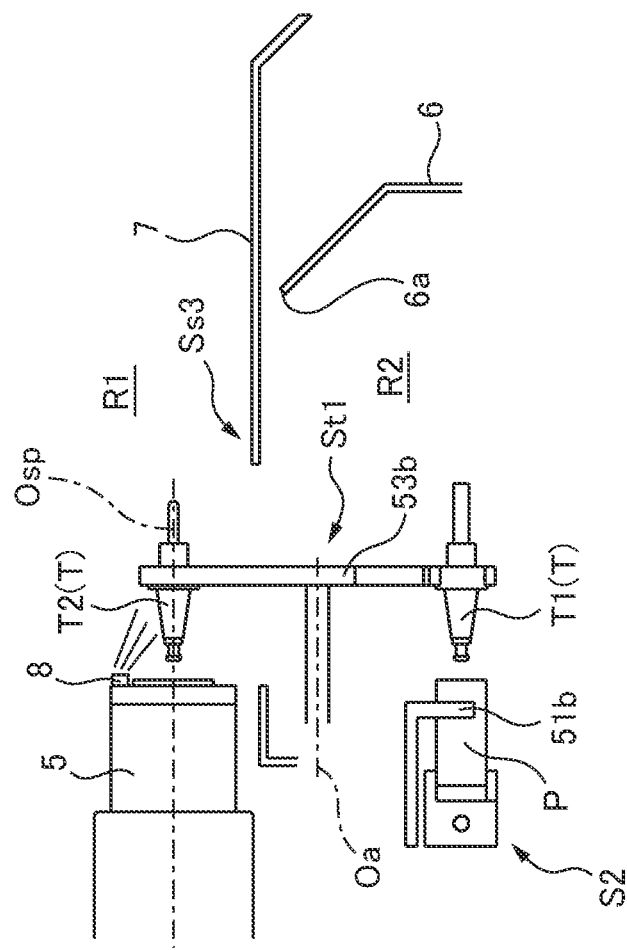

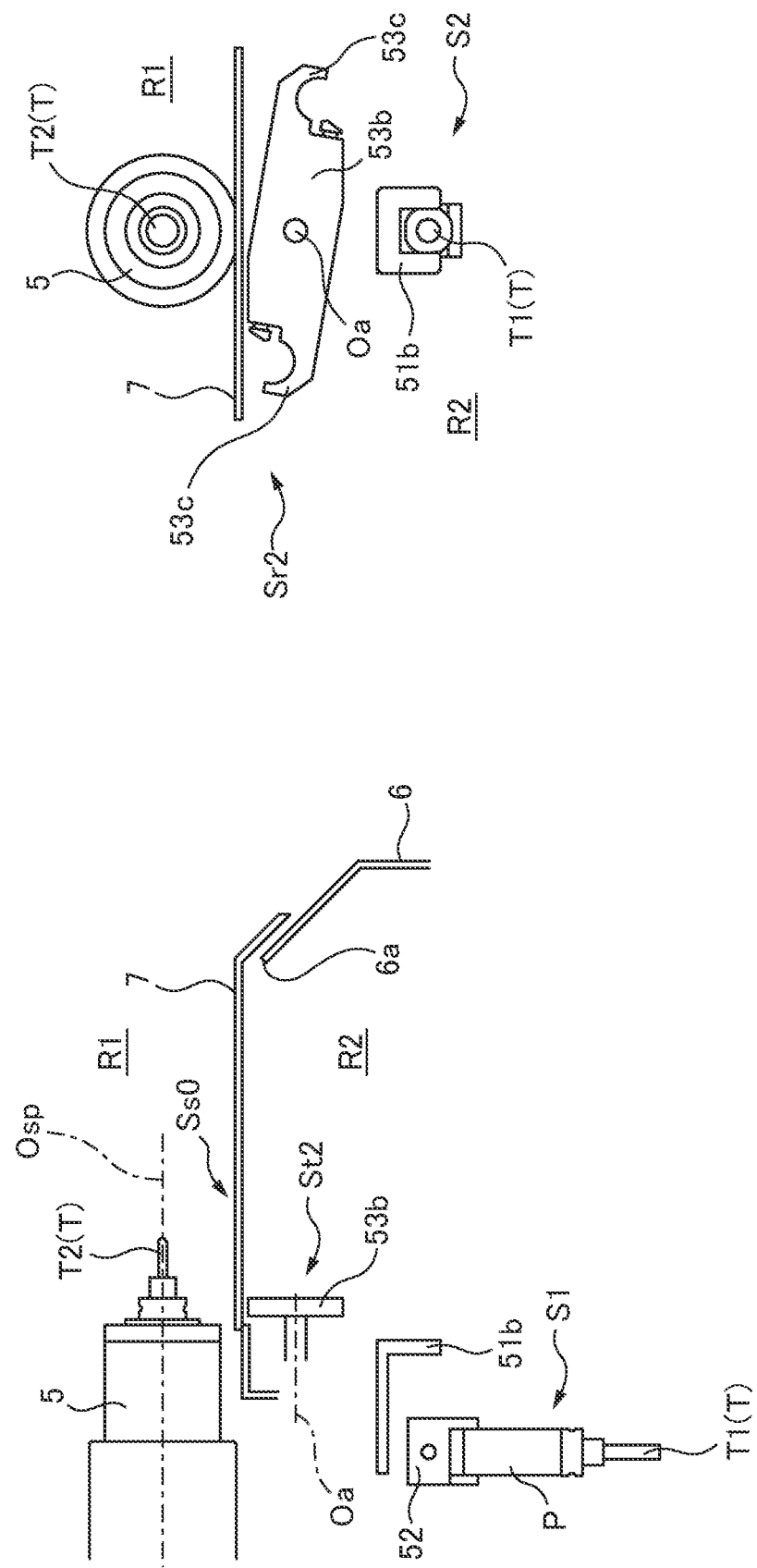

MACHINE TOOL

CROSS-REFERENCE TO RELATED APPLICATIONS

This application is a US National Stage Application under 35 USC 371 of International Patent Application No. PCT/JP2018/040596, filed Oct. 31, 2018, the entire contents of which is incorporated herein by reference.

FIELD OF THE DISCLOSURE

The present disclosure relates to a machine tool.

BACKGROUND OF THE DISCLOSURE

Machine tools may in some cases comprise a tool exchange device for exchanging a tool attached to a spindle and which accommodates a plurality of tools. For example, Patent Literature 1 discloses a machine tool comprising a tool magazine which holds a plurality of tools and a tool exchange arm arranged between a spindle and the tool magazine. The chamber in which the spindle is arranged and the chamber in which the tool magazine and tool exchange arm are arranged are partitioned by a cover. An opening is formed in the cover, and a side door is provided in the opening. During tool exchange, the side door is open, and during workpiece machining, the side door is closed in order to prevent the scattering of coolant and swarf. The opening and closing motions of the side door are synchronized with the movement of the tool exchange arm by a cam mechanism provided in a drive device of the tool exchange arm. As a result of such a mechanical configuration, the motions of the tool exchange arm and the side door are synchronized.

Patent Literature 2 discloses an ATC (Automatic Tool Changer) shutter of an automatic tool changer. The ATC shutter is configured to close during operations and open during tool exchange. The tool is exchanged by a rotary arm. A limit switch is provided in each of an opening start position and an opening end position of the ATC shutter, and when the ATC shutter reaches these positions, an opening start signal and an opening end signal are transmitted from the respective limit switches. The opening start signal and opening end signal of the ATC shutter are transmitted to a drive source of the rotary arm, and are used as a rotation start signal and a rotation end signal of the rotary arm, respectively. In this manner, the ATC shutter and the motion of the rotary arm are associated with the limit switches provided at the opening start position and the opening end position of the ATC shutter.

PATENT LITERATURE

[PTL 1] Japanese Unexamined Patent Publication (Kokai) No. 7-60596
[PTL 2] Japanese Unexamined Patent Publication (Kokai) No. 2007-030062

BRIEF SUMMARY OF THE DISCLOSURE

In the field of machine tools, a further shortening of tool exchange time is desired in order to shorten lead time.

An aspect of the present disclosure provides a machine tool which machines a workpiece in a machining chamber using a tool selected from a plurality of tools held in a tool holding chamber, the machine tool comprising an arm for exchanging a tool between a spindle in the machining chamber and a secondary tool standby position in the tool holding chamber, a shutter provided in an opening defined in a wall partitioning the machining chamber and the tool holding chamber, the shutter being movable between a fully open position and a fully closed position, a first motor for opening and closing the shutter, a shutter position detector which is capable of detecting a position of the shutter in an entire range between the fully open position and the fully closed position, a storage device in which predetermined positions of the shutter are stored in association with predetermined motions of the arm, and a controller which is configured to execute the predetermined motions of the arm based on the position of the shutter detected by the shutter position detector and the predetermined positions of the shutter stored in the storage device.

In the machine tool according to the aspect of the present disclosure, motion of the arm is executed based on the position of the shutter detected by the shutter position detector and the specific position of the shutter associated with the motion of the arm and stored in the storage device. Since the shutter position detector can detect the position of the shutter in the entire range between the fully open position and the fully closed position, the stored position of the shutter is adjusted, whereby the timing at which the motion of the arm is executed can be adjusted. Thus, the timing at which the motion of the arm is executed can be optimized in association with the motion of the shutter, whereby the tool exchange time can be shortened.

The arm may be rotatable between a tool engagement position for engaging with a tool mounted on the spindle and a tool in the secondary tool standby position and an arm standby position for standby of the arm, the arm may be translatable along an axis of rotation of the arm between a forward position for removing a tool from the spindle and a retreat position for engaging the tool with the spindle, the machine tool may further comprise a second motor for rotating the arm, and a third motor for translating the arm, and the controller may control at least one of the second motor and the third motor so as to control at least one of rotational motion and translational motion of the arm based on the position of the shutter detected by the shutter position detector and the predetermined positions of the shutter stored in the storage device. In this case, since the rotation and translation of the arm are performed by separate second and third motors, the motion of the arm can be further finely adjusted.

The controller may control the second motor so as to rotate the arm from the arm standby position to the tool engagement position when the shutter position detector detects that the shutter has moved from the fully closed position to the predetermined position. In this case, since the arm rotates simultaneously with the opening of the shutter, the rotational motion of the arm can be more quickly ended.

The machine tool may further comprise an arm translational position detector which can detect a translational position of the arm in the entire range between the forward position and the retreat position, and the controller may control the first motor so that the shutter starts to move from the fully open position to the fully closed position when the arm translational position detector detects that the arm has moved from the forward position to the retreat position, confirm whether rotation of the arm from the tool engagement position to the arm standby position has completed when the shutter position detector detects that the shutter has begun to move from the fully open position to the predetermined position, and control so as to stop movement of the shutter when the rotation has not completed. In this case, since the shutter starts to close when the arm moves to the retreat position (i.e., the tool is attached to the spindle) and the arm also rotates simultaneously with the closing of the shutter, the rotational motion of the arm can be more quickly ended.

The machine tool may further comprise a blower for blowing a gas onto a shank portion of the tool held by the arm when the arm is advancing or retreating, the storage device may store whether each tool is a standard tool or a high precision tool, and in the case in which the tool mounted on the spindle is a high precision tool, when the arm advances or retreats, the controller may reduce a translational speed of the arm to be made lower than that when the tool is a standard tool or reciprocate the arm multiple times to extend the time in which the gas is blown. In this case, the blowing of gas onto the shank portion of the high precision tool can be extended.

The controller may first complete rotational movement of the arm from the arm standby position to the tool engagement position by the second motor when the spindle moves to a position for tool exchange, and may engage the tool held in the spindle with the arm in accordance with movement of the spindle.

According to the aspect of the present disclosure, the tool exchange time can be shortened.

BRIEF DESCRIPTION OF THE FIGURES

FIG. 6 is a schematic view showing motion of the shutter and the arm.

FIG. 11 is a schematic view showing motion of the shutter and the arm.

FIG. 17 is a schematic view showing motion of the shutter and the arm.

DETAILED DESCRIPTION OF THE DISCLOSURE

The machine tool according to the embodiments will be described below with reference to the attached drawings. Identical or corresponding elements have been assigned the same reference sign, and duplicate descriptions thereof have been omitted. In order to facilitate understanding, the scales of the drawings have been appropriately changed, and constituent elements in certain drawings may be omitted from other drawings in some cases.

Figure 1:
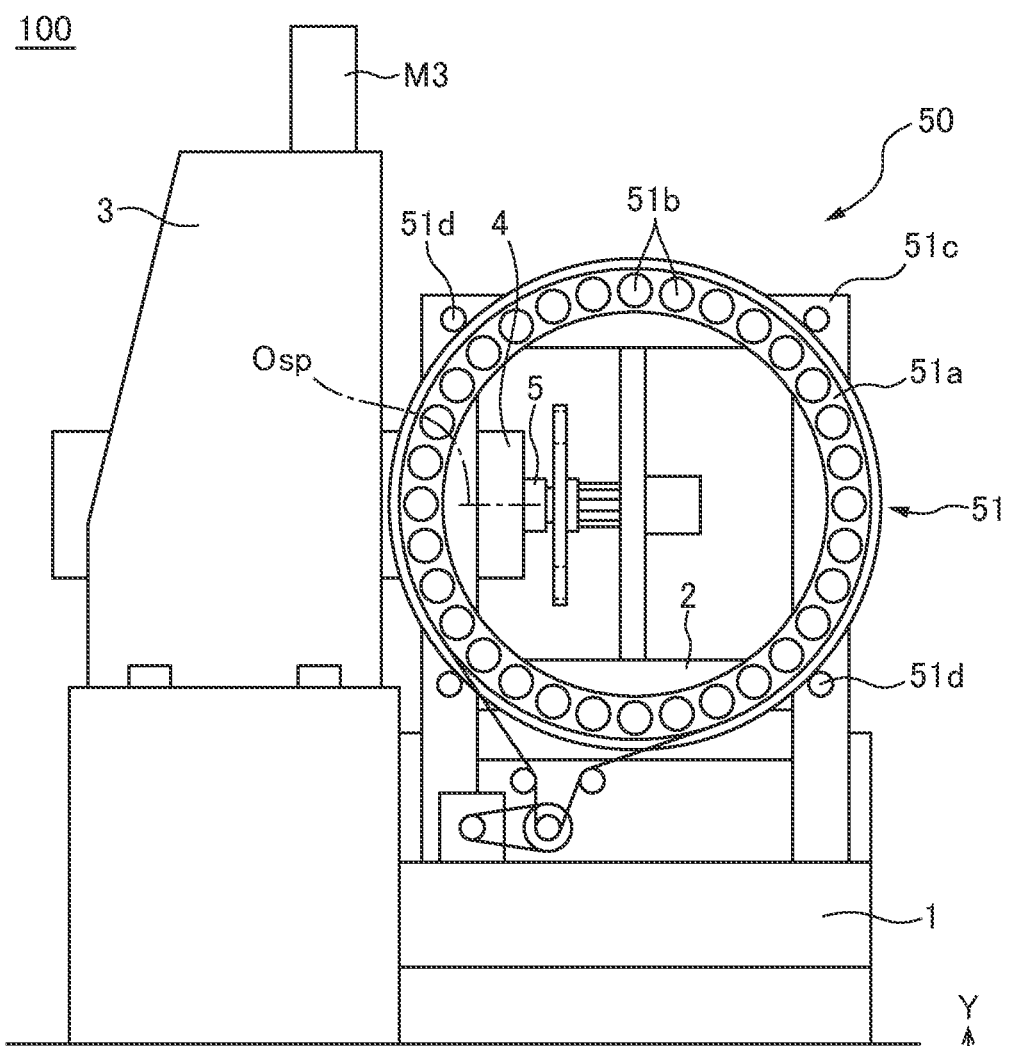
FIG. 1 is a schematic side view showing a machine tool according to an embodiment.

FIG. 1 is a schematic side view showing a machine tool 100 according to an embodiment. The machine tool 100 can be, for example, a horizontal machining center, and the axis of rotation Osp of the spindle 5 is set in the horizontal direction. The machine tool 100 may be vertical, or may be a machine tool other than a machining center. The machine tool 100 comprises a bed (base) 1, a table 2, a column 3, a spindle head 4, a spindle 5, a splashguard 6 (refer to FIG. 2), a shutter 7, a tool exchange device 50, a machine controller (controller) 60, and an NC device 70. The machine tool 100 may further comprise other constituent elements. It should be noted that in order to facilitate understanding, the splashguard 6 and shutter 7 have been omitted in FIG. 1.

Referring to FIG. 1, regarding the machine coordinate system of the machine tool 100, the direction parallel to the axis of rotation Osp is the Z-axis direction (also referred to as the front-rear directions). With respect to the column 3, the side on which the table 2 is arranged is the front, and the side opposite thereto is the rear. The vertical direction is the Y-axis direction (also referred to as the up-down directions), and the direction perpendicular to both the Z-axis and the Y-axis is the X-axis direction (also referred to as the left-right directions).

The bed 1 is installed on, for example, the floor of a factory. The table 2 supports a workpiece. The workpiece can be directly attached to the table 2 with a jig, or in another embodiment, the workpiece may be indirectly attached to the table 2 via a pallet. The table 2 is arranged so as to be movable on the bed 1.

Figure 2:
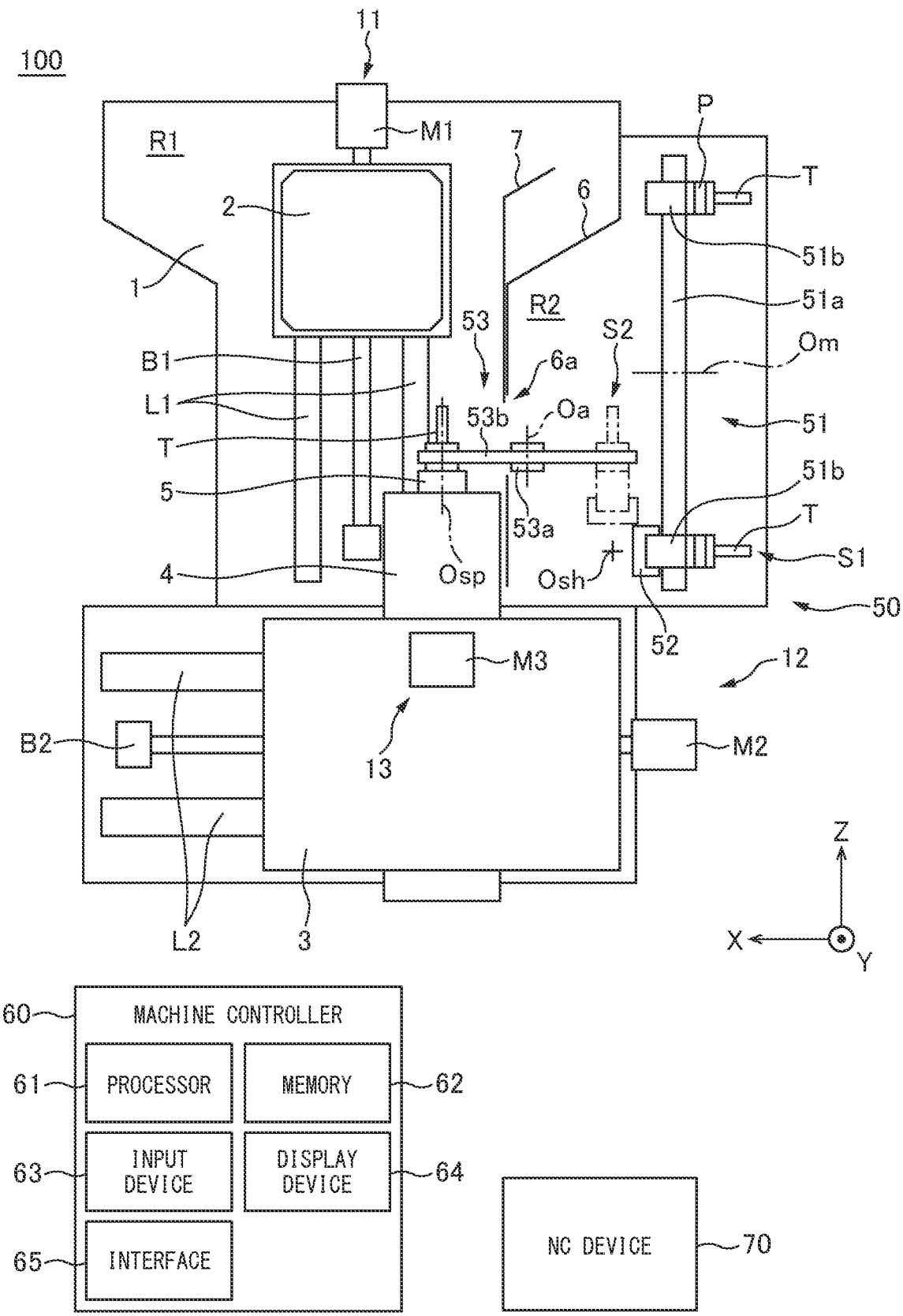
FIG. 2 is a schematic plan view showing the machine tool of FIG. 1.

FIG. 2 is a schematic plan view showing the machine tool 100 of FIG. 1. The machine tool 100 comprises a Z-axis drive device 11 which moves the table 2 in the Z-axis direction on the bed 1. The Z-axis drive device 11 has a pair of linear guides L1 arranged on the bed 1 along the Z-axis, and moves the table 2 on the rails of the linear guides L1. The Z-axis drive device 11 further comprises a ball screw B1 connected to the table 2, and a motor M1 for rotating the ball screw B1. The feeding of the table 2 in the Z-axis direction by the Z-axis drive device 11 is controlled by the NC device 70.

The column 3 is movably arranged on the bed 1 so as to face the table 2 in the Z-axis direction. The machine tool 100 comprises an X-axis drive device 12 which moves the column 3 along the X-axis. The X-axis drive device 12 has a pair of linear guides L2 arranged on the bed 1 along the X-axis, and moves the column 3 on the rails of the linear guides L2. The X-axis drive device 12 further comprises a ball screw B2 connected to the column 3, and a motor M2 for rotating the ball screw B2. The feeding of the column 3 in the X-axis direction by the X-axis drive device 12 is controlled by the NC device 70.

The spindle head 4 is movable arranged on the column 3. The spindle head 4 penetrates from the front surface to the rear surface of the column 3. The machine tool 100 comprises a Y-axis drive device 13 which moves the spindle head 4 along the Y-axis. The Y-axis drive device 13 has a linear guide (not illustrated) arranged on the column 3 along the Y-axis, and moves the spindle head 4 on the rails of the linear guide. The Y-axis drive device 13 further comprises a ball screw (not illustrated) connected to the spindle head 4 and a motor M3 for rotating the ball screw. The feeding of the spindle head 4 in the Y-axis direction by the Y-axis drive device 13 is controlled by the NC device 70.

The spindle 5 is rotatably arranged in the interior of the spindle head 4. The spindle 5 supports a tool T. The rotation of the spindle 5 is controlled by the NC device 70.

The splashguard 6 partitions a machining chamber R1 for machining workpieces and a tool holding chamber R2 in which a plurality of tools T are held. The splashguard 6 prevents the scattering of coolant and swarf out of the machining chamber R1.

Figure 3:
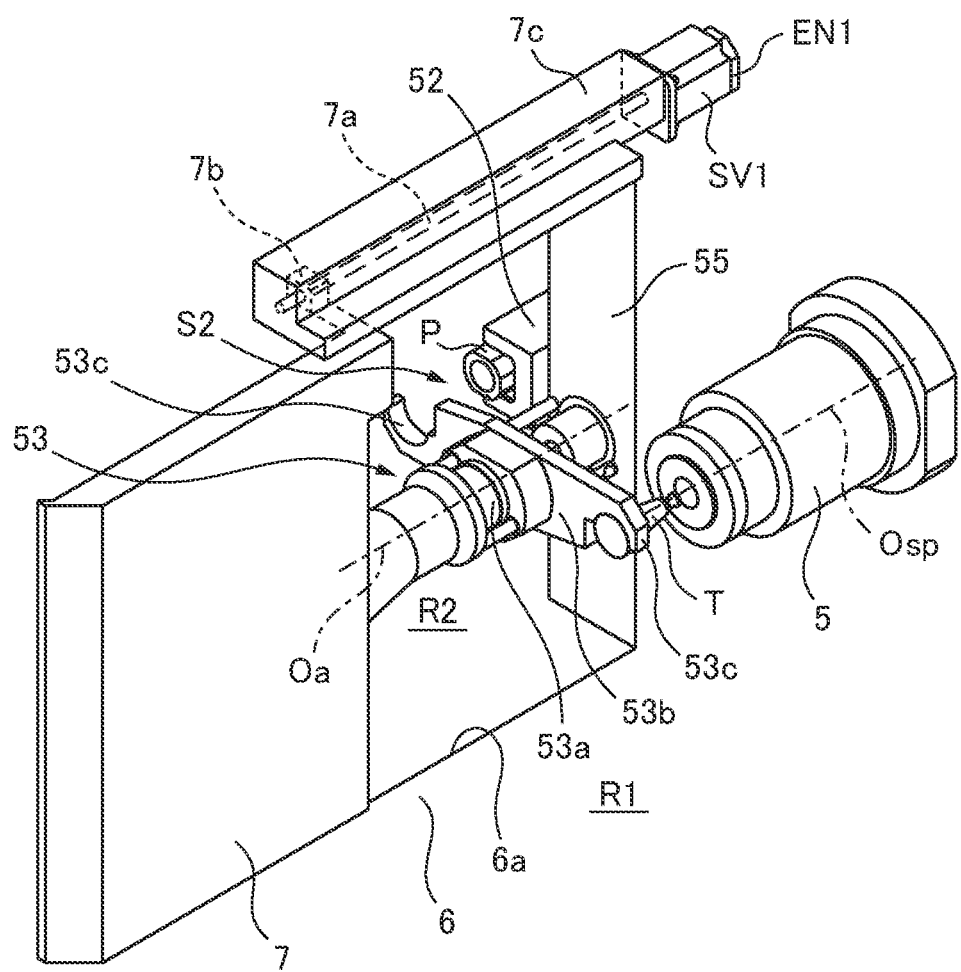
FIG. 3 is a schematic perspective view showing a shutter and an arm.

FIG. 3 is a schematic perspective view of the shutter 7 and an arm 53. An opening 6a for passage of the tool T during tool exchange is defined in the splashguard 6. The shutter 7 is provided in the opening 6a. The shutter 7 can move between a fully open position as shown in FIG. 3 and a fully closed position (refer to FIG. 6).

Referring to FIG. 3, the machine tool 100 comprises a first motor SV1 for opening and closing the shutter 7. The first motor SV1 is affixed to a cover 7c. The cover 7c can be affixed to a fixed constituent element such as the splashguard 6 or another frame. A threaded part 7a is connected to the shaft of the first motor SV1. A nut part 7b is engaged with the threaded part 7a. The nut part 7b is connected to the shutter 7. The threaded part 7a and the nut part 7b are surrounded by the cover 7c, and as a result, are protected from coolant and swarf. When the first motor SV1 rotates the threaded part 7a, the nut part 7b and the shutter 7 move in accordance with the threaded part 7a. The movement of the shutter 7 is controlled by the machine controller 60.

The first motor SV1 can be, for example, a servo motor and can include an encoder EN1. In this case, the encoder EN1 functions as a shutter position detector which is capable of detecting the position of the shutter 7 in the entire range between the fully open position and the fully closed position. Specifically, referring to FIG. 2, a processor 61 of the machine controller 60 can calculate a movement amount of the shutter 7 from the origin (for example, the fully open position or the fully closed position) based on the pitches of the threaded part 7a and the nut part 7b stored in a memory 62 and the amount of rotation of the first motor SV1 received from the encoder EN1. Thus, the position of the shutter 7 can be detected. In this manner, the encoder EN1 can function as a shutter position detector.

The tool exchange device 50 is configured to hold a plurality of tools T and exchange the tool T attached to the spindle 5. The tool exchange device 50 comprises a tool magazine 51, a shifter 52, and an arm 53.

The tool magazine 51 holds a plurality of tools T. The tool magazine 51 comprises, for example, a magazine body 51a and a plurality of tool pot holding parts 51b. Referring to FIG. 1, the magazine body 51a has a substantially annular shape or circular endless shape (or a closed linear shape). The magazine body 51a is arranged on the side of the spindle 5 so that the endless shape thereof lies along the YZ plane. The direction of arrangement of the magazine body 51a is not limited thereto.

The magazine body 51a can be rotatably supported by, for example, a plurality of rollers 51d provided on a frame 51c. The magazine body 51a is connected to a drive device such as a motor via a belt, a chain and/or gears (not illustrated). Referring to FIG. 2, the magazine body 51a is configured so as to rotate about an axis of rotation Om parallel to the X-axis direction. The rotation of the magazine body 51a is controlled by the machine controller 60.

The plurality of tool pot holding parts 51b are arranged along the endless shape of the magazine body 51a. Thus, as the magazine body 51a rotates, the plurality of tool pot holding parts 51b move in a circular circulation path (or endless path) along the YZ plane. The tool magazine 51 is configured so as to position a selected tool pot holding part 51b in a selection position S1.

Each of the tool pot holding parts 51b removably holds a tool pot P. The tool pot holding parts 51b can include, for example, elastic means such as leaf springs for holding the tool pots P. The tool pots P removably hold tools T using a well-known means (not illustrated).

The shifter 52 can move a tool pot P between the tool pot holding part 51b in the selection position S1 and a secondary tool standby position S2. The shifter 52 is arranged between the spindle 5 and the tool magazine 51. The shifter 52 has a claw-like clamping mechanism (not illustrated) which can clamp and unclamp the tool pot P. The shifter 52 is rotatable about an axis of rotation Osh. The shifter 52 moves about the axis of rotation Osh between the selection position S1 and the secondary tool standby position S2.

The secondary tool standby position S2 is positioned at the same angle as the selection position S1 in the circumferential direction of the tool magazine 51. Furthermore, the secondary tool standby position S2 is positioned more inside than the selection position S1 in the radial direction of the tool magazine 51. The rotational angle between the selection position S1 and the secondary tool standby position S2 is, for example, 90°. The rotational motion of the shifter 52 can be driven by, for example, a motor (not illustrated). The rotational motion of the shifter 52 is controlled by the machine controller 60.

Referring to FIG. 3, the arm 53 exchanges the tool T between the spindle 5 and the tool pot P in the secondary tool standby position S2. The arm 53 is arranged between the spindle 5 and the shifter 52. The arm 53 can rotationally move about an axis of rotation Oa parallel to the axis of rotation Osp of the spindle 5 and translationally move along the axis of rotation Oa. The arm 53 is rotatably and translatably attached to a gearbox 55. The gearbox 55 houses gears 53d to 53g (refer to FIG. 4; to be described in detail later) for moving the arm 53.

Referring to FIG. 3, the arm 53 comprises a shaft part 53a and an arm part 53b. The shaft part 53a extends along the axis of rotation Oa. The arm part 53b extends radially from the shaft portion 53a on both sides thereof, and includes two grippers 53c at the ends thereof for gripping tools.

Figure 4:
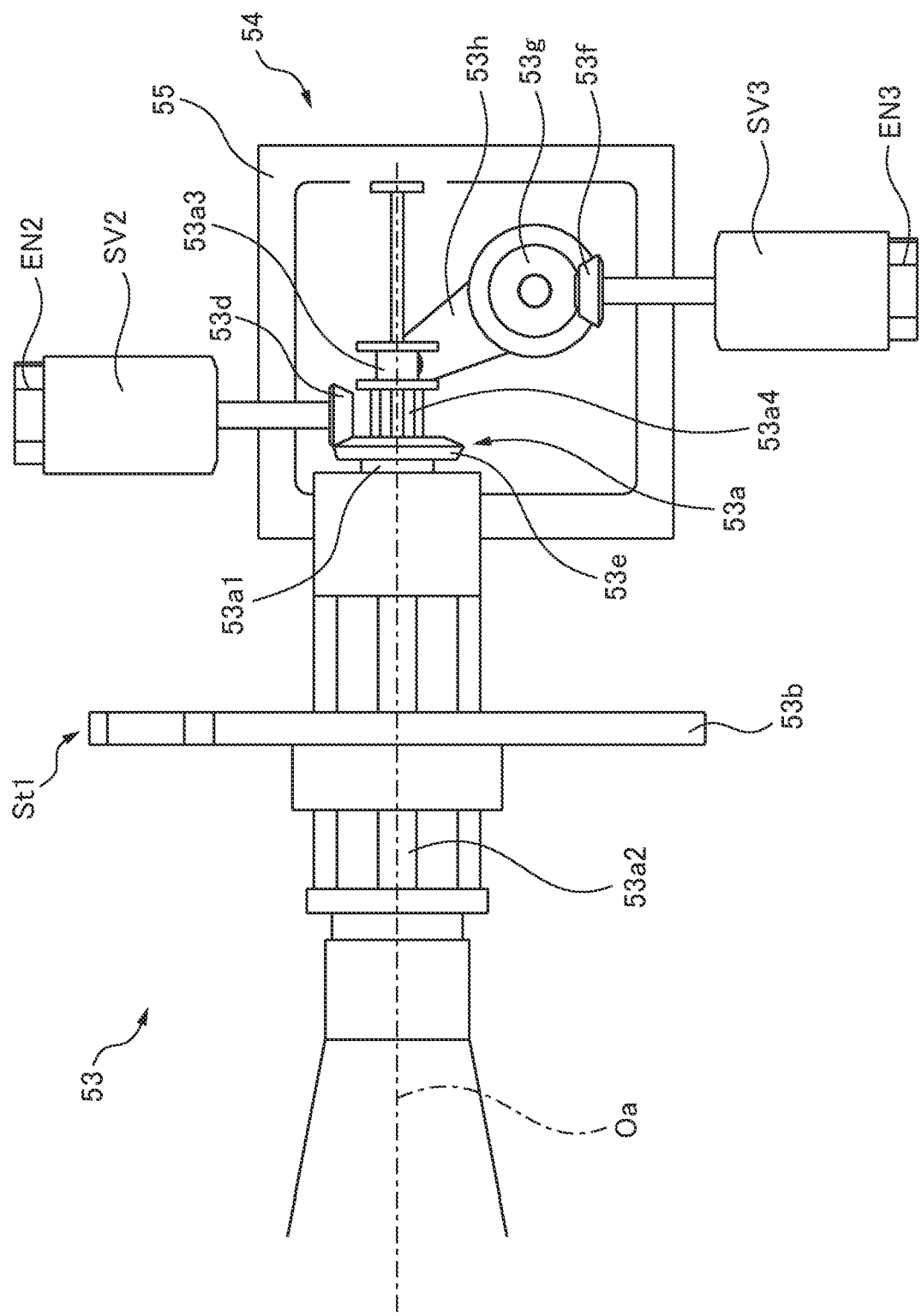
FIG. 4 is a schematic side view showing an arm and an arm drive device when the arm is in a forward position.
Figure 5:
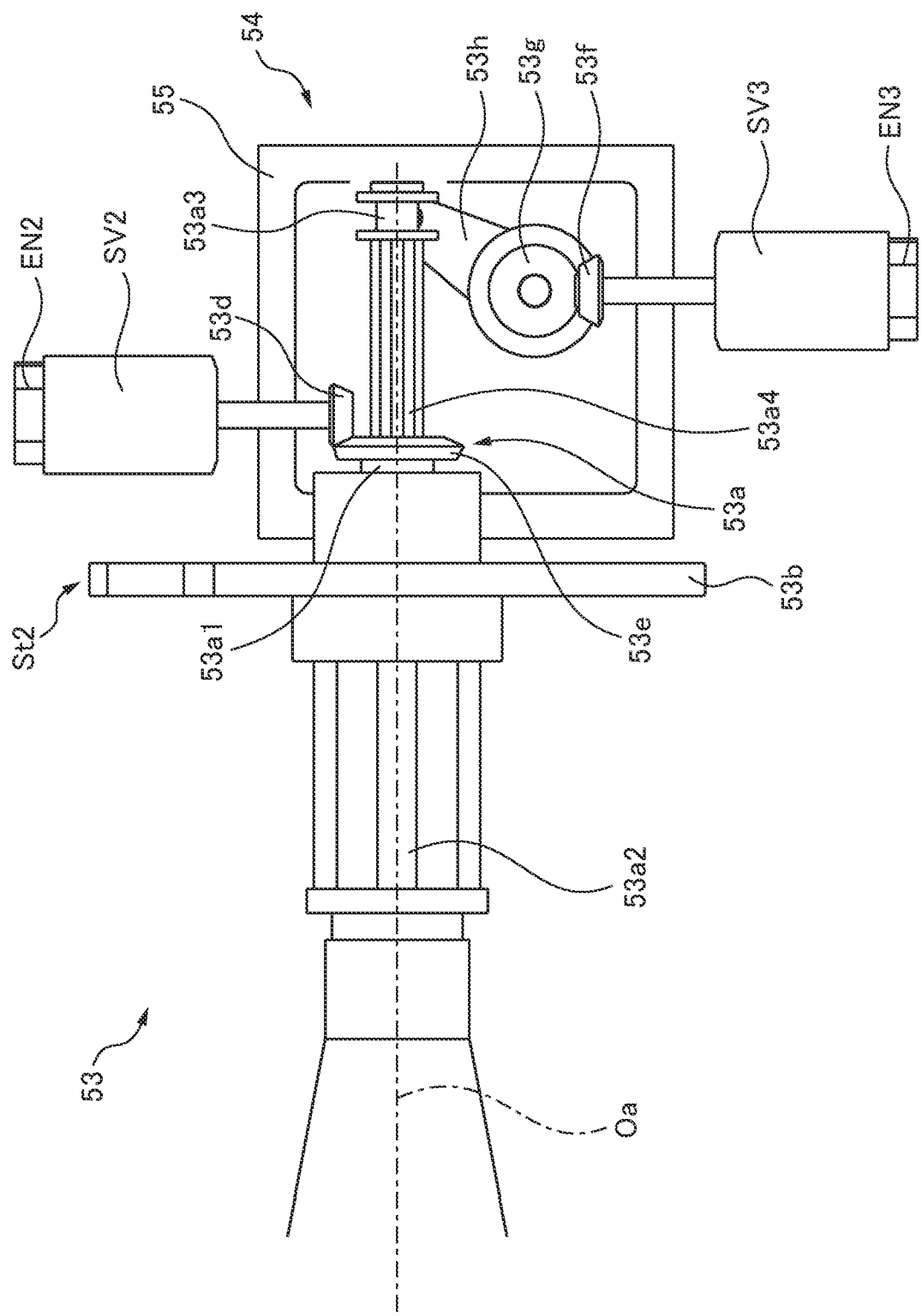
FIG. 5 is a schematic side view showing the arm and the arm drive device when the arm is in a retreat position.

FIG. 4 is a schematic side view showing the arm 53 and the arm drive device 54 when the arm 53 is in a forward position St1, and FIG. 5 is a schematic side view showing the arm 53 and the arm drive device 54 when the arm 53 is in a retreat position St2. Referring to FIG. 4, the shaft part 53a of the arm 53 includes a first shaft part 53a1, a second shaft part 53a2, and a fitting 53a3.

The first shaft part 53a1 is rotatably attached to the gearbox 55 but does not translate along the axis of rotation Oa. The second shaft part 53a2 is arranged radially inside of the first shaft part 53a1 and translates inside the first shaft part 53a1 along the axis of rotation Oa. The arm part 53b is affixed to the second shaft part 53a2. Splines 53a4 having projections extending along the axis of rotation Oa are provided on a part of the second shaft part 53a2, and corresponding grooves (not illustrated) are provided in the inner circumferential surface of the first shaft part 53a1. Due to this structure, the rotational motion of the first shaft part 53a1 is transmitted to the second shaft part 53a2 and the arm part 53b affixed thereto. The fitting 53a3 is rotatably attached to the second shaft part 53a2. Thus, the fitting 53a3 translates together with the second shaft part 53a2 but does not rotate along with the second shaft part 53a2.

The machine tool 100 comprises an arm drive device 54 for moving the arm 53. The arm drive device 54 comprises a second motor SV2 for rotating the arm part 53b and a third motor SV3 for translating the arm part 53b.

The shaft of the second motor SV2 is connected to a first bevel gear 53d. A second bevel gear 53e which meshes with the first bevel gear 53d is provided on the first shaft part 53a1 of the arm 53. When the second motor SV2 rotates the first bevel gear 53d, the second bevel gear 53e and the first shaft part 53a1 rotate about the axis of rotation Oa, and the second shaft part 53a2 and the arm part 53b rotate about the axis of rotation Oa via the splines 53a4. The rotation of the arm part 53b is controlled by the machine controller 60.

The second motor SV2 can be, for example, a servo motor and can include an encoder EN2. In this case, the encoder EN2 functions as an arm rotational position detector which is capable of detecting the rotational position of the arm part 53b in the entire range. Specifically, the processor 61 of the controller 60 can calculate the amount of rotation of the arm part 53b from the arm origin (for example, a tool engagement position Sr1 or an arm standby position Sr2 (which are described in detail later) based on the gear ratio between the first bevel gear 53d and the second bevel gear 53e stored in the memory 62 and an amount of rotation of the second motor SV2 received from the encoder EN2. Thus, the rotational position of the arm 53b can be detected. In this manner, the encoder EN2 can function as an arm rotational position detector.

A third bevel gear 53f is connected to the shaft of the third motor SV3, and a fourth bevel gear 53g which meshes with the third bevel gear 53f is rotatably attached to the gearbox 55. The fourth bevel gear 53g and the fitting 53a3 of the arm 53 are connected by a crank 53h. One connection part of the crank 53h is affixed to the fourth bevel gear 53g, and the other connection part thereof is engaged with the fitting 53a3 so as to be capable of rotating and moving in the up-down directions in FIG. 4. When the third motor SV3 rotates the third bevel gear 53f, the fourth bevel gear 53g and the crank 53h rotate, and as a result, the second shaft part 53a2 and the arm part 53b affixed thereto translate along the axis of rotation Oa via the fitting 53a3. The translation of the arm part 53b is controlled by the machine controller 60.

The third motor SV3 can be, for example, a servo motor and can include an encoder EN3. In this case, the encoder EN3 functions as an arm translational position detector which is capable of detecting the translational position of the arm part 53b in the entire range. Specifically, the processor 61 of the machine controller 60 can calculate a translation amount of the arm 53 from the origin (for example, the forward position St1 or the retreat position St2) based on the gear ratio between the third bevel gear 53f and the fourth bevel gear 53g stored in the memory 62, the length between the connection parts of the crank 53h, and the amount of rotation of the third motor SV3 received from the encoder EN3, and thus, the translation position of the arm 53 can be detected. In this manner, the encoder EN3 can function as an arm translational position detector.

FIGS. 6 to 17 are schematic views showing motions of the shutter 7 and the arm 53, and in each of FIGS. 6 to 17, the left drawing is a schematic plan view and the right drawing is a schematic front view. In the examples of FIGS. 6 to 17, the long tool T1 attached to the spindle 5 and the short tool T2 in the secondary tool standby position S2 are exchanged.

Regarding the rotational motion of the arm 53, referring to the right drawings of FIGS. 6 to 17, the arm 53 can rotate between the tool engagement position Sr1 (refer to the right drawings of FIGS. 8, 9, 10, 11, 12, 13, and 14) for engaging the tool T mounted on the spindle 5 and the tool T in the secondary tool standby position S2 and the arm standby position Sr2 (refer to the right drawings of FIGS. 6, 7, 15, 16, and 17) for standby of the arm 53.

Figure 8:
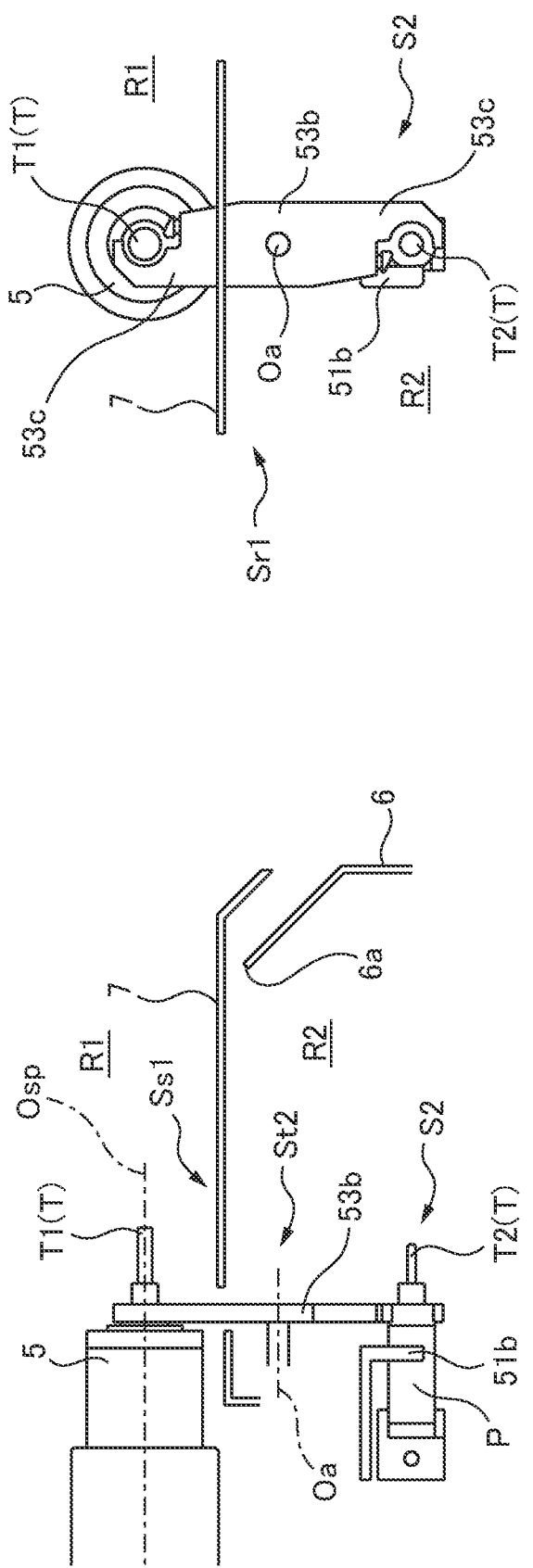
FIG. 8 is a schematic view showing motion of the shutter and the arm.

Referring to the right drawing of FIG. 8, in the tool engagement position Sr1, the arm 53 is arranged so that one of the grippers 53c is positioned in the machining chamber R1 and the other is positioned in the tool holding chamber R2. In the tool engagement position Sr1, one of the grippers 53c engages with the holder of the tool T mounted on the spindle 5 and the other engages the holder of the tool T in the secondary tool standby position S2. Referring to the right drawings of FIGS. 6 and 8, the arm standby position Sr2 (the right drawing of FIG. 6) is separated from the tool engagement position Sr1 (the right drawing of FIG. 8) by 90° clockwise or counter-clockwise about the axis of rotation Oa. Referring to the right drawing of FIG. 6, in the arm standby position Sr2, the arm 53 is arranged so that both grippers 53c are positioned in the tool holding chamber R2.

Regarding the translational motion of the arm 53, referring to the left drawings of FIGS. 6 to 17, the arm 53 is translatable along the axis of rotation Oa between the forward position St1 (refer to the left drawings of FIGS. 9, 10, 11, and 12) for removing the tool T from the spindle 5 and removing the tool T from the tool pot P in the secondary tool standby position S2 and the retreat position St2 (refer to the left drawings of FIGS. 6, 7, 8, 13, 14, 15, 16, and 17) for engaging the tool T with the spindle 5 and inserting the tool T into the tool pot P in the secondary tool standby position S2.

Referring to FIG. 1, the machine controller 60 controls the motion of the tool exchange device 50 based on a control program. Furthermore, the machine controller 60 can control the motion of other machine constituent elements in the machine tool 100 other than the constituent elements (for example, the X-axis drive device 12, the Y-axis drive device 13, the Z-axis drive device 11, the spindle 5, etc.) controlled by the NC device 70. The machine controller 60 can comprise, for example, a processor 61, a memory 62, an input device 63, a display device 64, and an interface 65, and these constituent elements can be connected to each other by, for example, busses. The machine controller 60 may further comprise other constituent elements. The processor 61 can be, for example, one or a plurality of CPUs (Central Processing Units).

The memory 62 may include a storage device such as, for example, ROM (read-only memory), RAM (random access memory), and a hard disk drive. The memory 62 stores the program for the processor 61 to control the motion of the arm 53 in association with the position of the shutter 7 during tool exchange motions (which will be described in detail later). Furthermore, the memory 62 can store various other control programs performed by the processor 61. The memory 62 can also store pitches of the threaded part 7a and the nut part 7b described above in association with the calculation of the position of the shutter 7. As a result, when an amount of rotation is received from the encoder EN1 of the first motor SV1, the processor 61 can calculate the position of the shutter 7 based on the pitches of the threaded part 7a and the nut part 7b stored in the memory 62 and the received amount of rotation. Furthermore, the memory 62 can store the gear ratio between the first bevel gear 53d and the second bevel gear 53e described above in association with the calculation of the rotational position of the arm part 53b. Furthermore, the memory 62 can store the gear ratio between the third bevel gear 53f and the fourth bevel gear 53g as well as the length between the connection parts of the crank 53h in association with the calculation of the translational position of the arm part 53b.

Furthermore, the memory 62 can store one or a plurality of predetermined positions of the shutter 7 in association with predetermined motions of the arm 53. When the calculated position of the shutter 7 matches a predetermined position stored in the memory 62, the processor 61 transmits (which will be described in detail later) a signal to at least one of the second motor SV2 and the third motor SV3 so as to start the predetermined motion of the arm 53.

The predetermined motions of the arm 53 associated with the predetermined positions of the shutter 7 can include various motions. Furthermore, the predetermined positions of the shutter 7 stored in the memory 62 can include any position between the fully closed position and the fully open position of the shutter 7, inclusive of the fully closed position and the fully open position.

Figure 7:
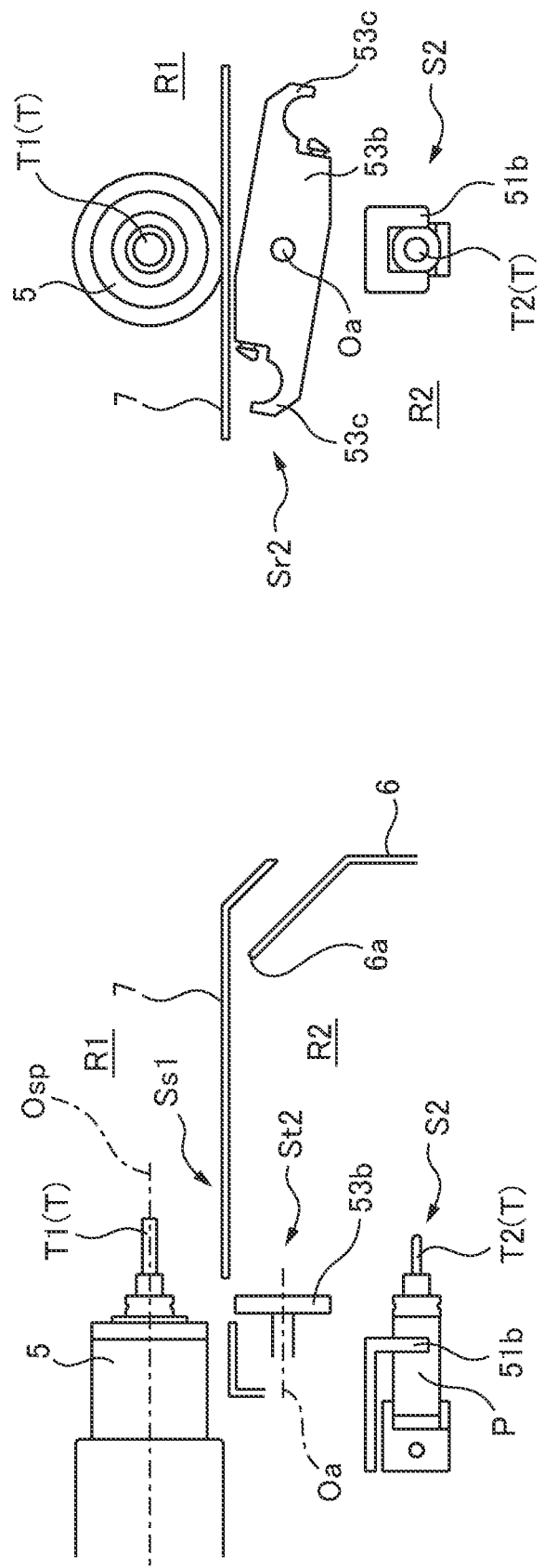
FIG. 7 is a schematic view showing motion of the shutter and the arm.

Referring to FIGS. 7 and 8, for example, the predetermined motion of the arm 53 is the rotational motion (90°) from the arm standby position Sr2 (the right drawing of FIG. 7) to the tool engagement position Sr1 (the right drawing of FIG. 8) while the shutter 7 is open. In this case, a first predetermined position Ss1 (refer to the left drawings of FIGS. 7 and 8) of the shutter 7 stored in the memory 62 is a position spaced from the fully closed position so that the arm 53 does not come into contact with the shutter 7.

It should be noted that though the movement of the spindle 5 to the position for tool exchange is already completed in the stages of FIGS. 6 and 7, the arm 53 may first move rotationally and then the spindle 5 may move to the tool exchange position illustrated in FIGS. 6 to 8. Up to the stage of FIG. 8, either the movement of the spindle 5 or the rotational motion of the arm 53 may be completed first. When the arm 53 has completed motion first, the spindle 5 may approach the arm 53 from a direction in which the held tool can engage with the gripper 53c.

Figure 9:
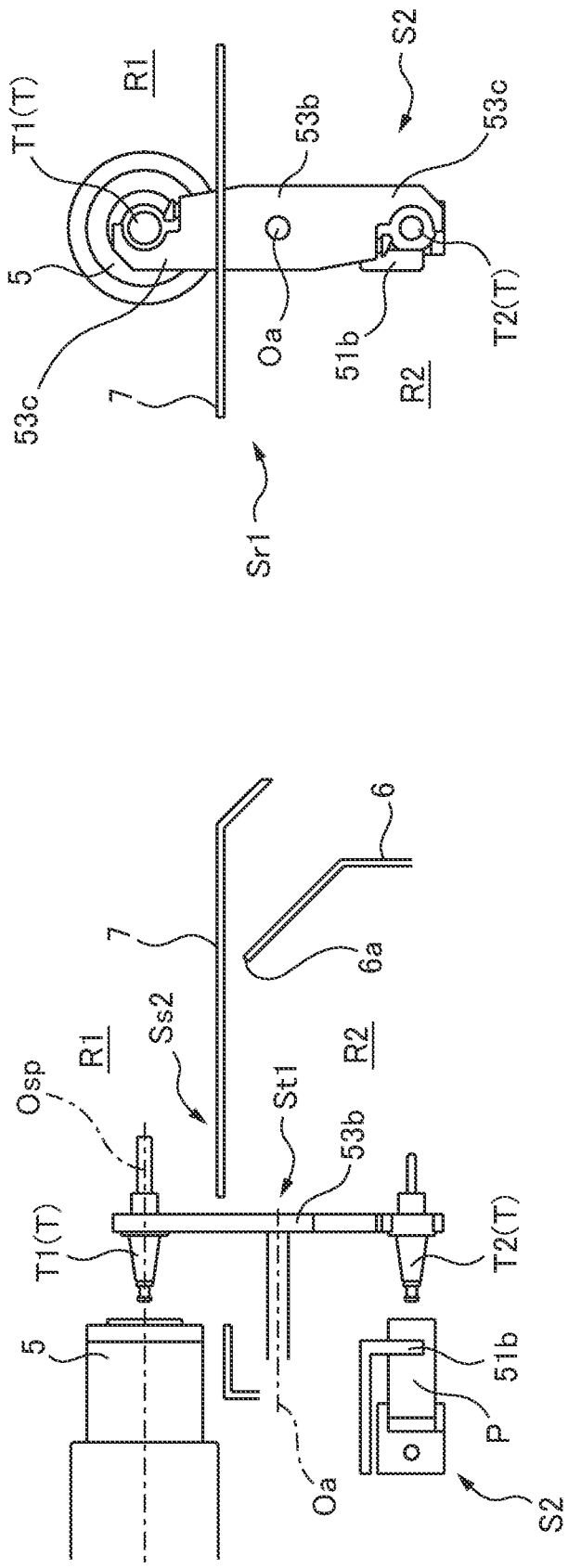
FIG. 9 is a schematic view showing motion of the shutter and the arm.

Furthermore, referring to FIGS. 8 and 9, for example, the predetermined motion of the arm 53 may be a translation motion from the retreat position St2 (the left drawing of FIG. 8) to the forward position St1 (the right drawing of FIG. 9) while the shutter 7 is open. In this case, a second predetermined position Ss2 of the shutter 7 stored in the memory 62 can be a position spaced from the fully closed position so that the advanced arm part 53b does not come into contact with the shutter 7. Alternatively, the arm 53 may translate from the retreat position St2 to the forward position St1 after the shutter 7 has finished opening (refer to FIG. 12). In this case, a fourth predetermined position Ss4 of the shutter 7 stored in the memory 62 can be the fully open position.

Figure 10:
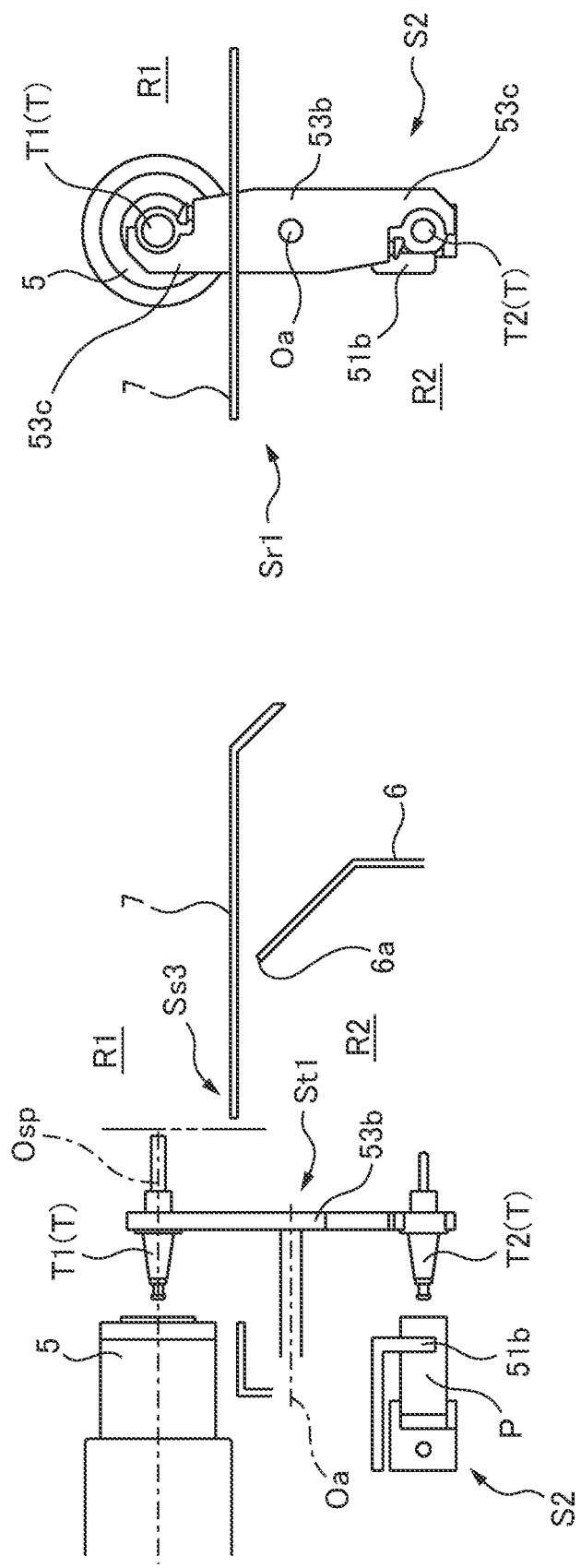
FIG. 10 is a schematic view showing motion of the shutter and the arm.

Furthermore, referring to FIGS. 10 and 11, for example, the predetermined motion of the arm 53 is a rotational motion (180°) for exchanging the tool T1 and the tool T2, i.e., a movement from one tool engagement position Sr1 (refer to FIG. 10) to the other tool engagement position Sr1 (refer to FIG. 11) while the shutter 7 is open. In this case, a third predetermined position Ss3 of the shutter 7 stored in the memory 62 can be a position spaced from the fully closed position so that the tools T1, T2 (in particular, the long tool T1) held by the arm 53 do not come into contact with the shutter 7. Alternatively, the arm 53 may rotate by 180° for exchanging the tool T1 and the tool T2 after the opening of the shutter 7 has completed (refer to FIG. 12). In this case, a fourth predetermined position Ss4 of the shutter 7 stored in the memory 62 can be the fully open position.

Figure 14:
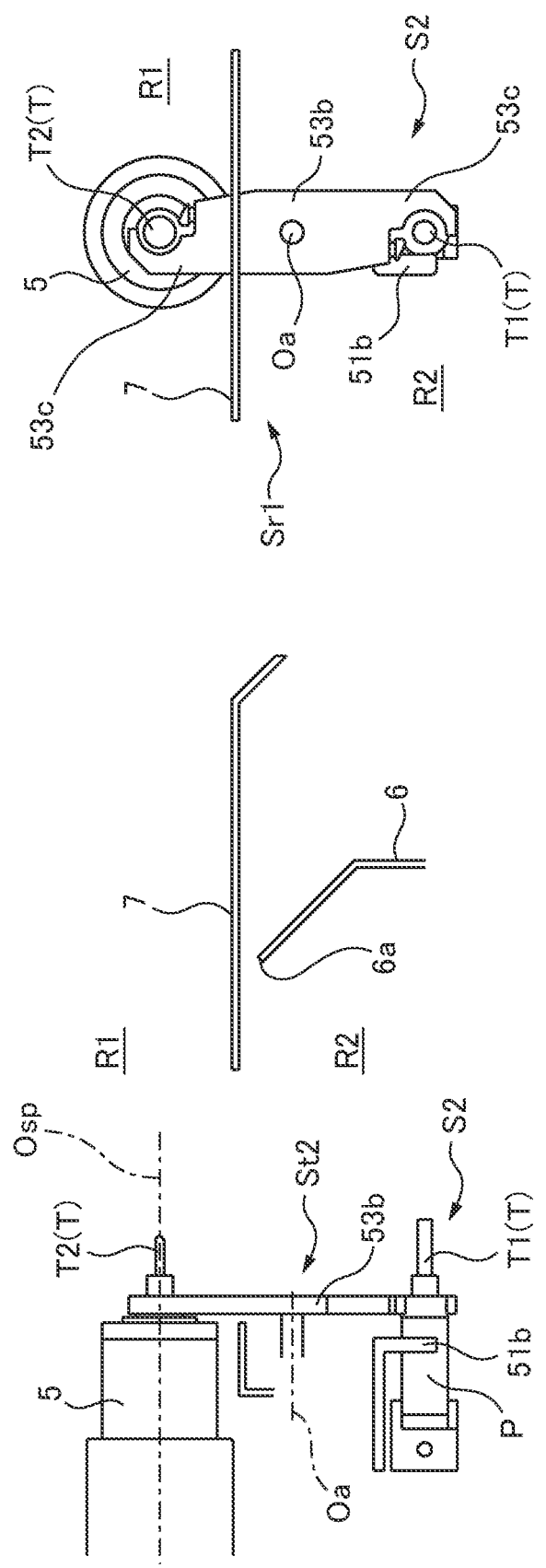
FIG. 14 is a schematic view showing motion of the shutter and the arm.
Figure 15:
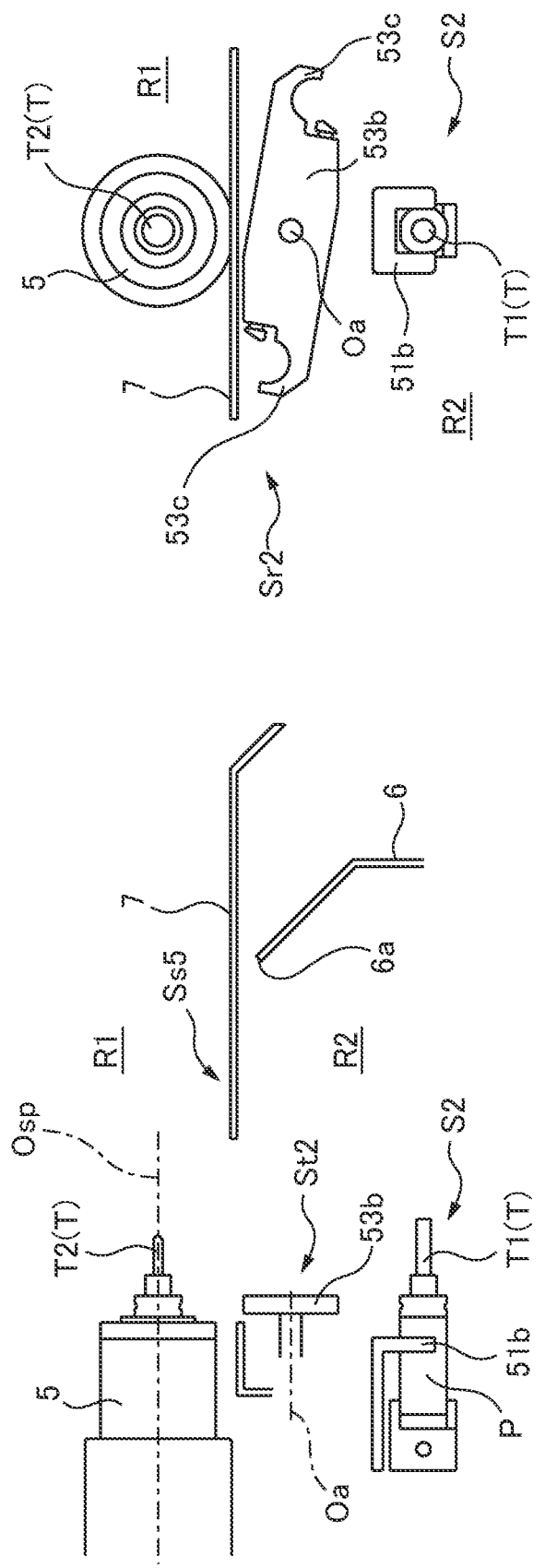
FIG. 15 is a schematic view showing motion of the shutter and the arm.

Furthermore, referring to FIGS. 14 and 15, for example, the predetermined motion of the arm 53 is a rotational motion (90°) from the tool engagement position Sr1 (the right drawing of FIG. 14) to the arm standby position Sr2 (the right drawing of FIG. 15) when the shutter is closed after the exchange of the tools T1, T2 has completed. In this case, a fifth predetermined position Ss5 (refer to the left drawing of FIG. 15) of the shutter 7 stored in the memory 62 can be a position spaced from the fully closed position so that the arm 53 does not come into contact with the shutter 7.

The memory 62 can store the predetermined position of the shutter 7 for each tool in accordance with the characteristics of the tool. Furthermore, the memory 62 can store at least one of, for example, the movement speed of the shutter 7, the translational speed of the arm 53, and the rotational speed of the arm 53 for each tool in accordance with the characteristics of the tool.

For example, the memory 62 can store the predetermined position of the shutter 7 for each tool in accordance with the length (for example, long, standard, short, etc.) of the tool. For example, as described above, when the arm 53 rotates by 180° for exchanging the tool T1 and the tool T2 while the shutter 7 is open (refer to FIGS. 10 and 11), it is necessary that the third predetermined position Ss3 of the shutter 7 be a position spaced from the fully closed position so that the tools T1, T2 (in particular, the long tool T1) held by the arm 53 do not come into contact with the shutter 7. Thus, a position spaced further from the fully closed position as compared to the short tool T2 is stored for the long tool T1. It should be noted that when the arm 53 holds the long tool T1 and the short tool T2, the processor 61 uses the position stored for the long tool T1 for safety purposes.

Furthermore, for example, the memory 62 can store the predetermined position of the shutter 7 for each tool in accordance with the weight (for example, heavy, standard, light, etc.) of the tool. For example, as described above, when the arm 53 rotates by 180° to exchange the tool T while the shutter 7 is open (refer to FIGS. 10 and 11), it is necessary that the third predetermined position Ss3 of the shutter 7 be a position spaced from the fully closed position so that the tool T held by the arm 53 does not come into contact with the shutter 7. At this time, when the arm 53 holds a heavy tool T, there is a risk that the rotation of the arm 53 will become slow. Furthermore, when the arm 53 holds a heavy tool T, the shutter 7 may be significantly damaged by contact with the tool T. Thus, a position spaced further from the fully closed position as compared to the light tool T is stored for the heavy tool T. It should be noted that when the arm 53 holds a heavy tool T and a light tool T, the processor 61 uses the stored position for the heavy tool T for safety purposes.

Furthermore, for example, the memory 62 can store the movement speed of the shutter 7 for each tool in accordance with the precision (for example, high precision, standard precision, etc.) of the tool. For example, referring to FIGS. 11 and 12, the machine tool 100 can comprise a blower 8 for removing dust and/or swarf adhering to the shank portion of the tool T. The blower 8 can be provided on, for example, the spindle 5 or another constituent element. The blower 8 can blow a gas (for example, air) onto the shank portion of the tool T before the tool T is attached to the spindle 5. When spraying gas onto the shank portion, the tool T may be moved back and forth by translating the arm 53 back and forth. As a result, dust and/or swarf adhering to the shank portion of the tool T can be efficiently removed. When the arm 53 holds a high-precision tool T, if the tool T is attached to the spindle 5 with dust and/or swarf adhered to the shank portion, high machining precision may not be obtained. Thus, when the arm 53 holds a high-precision tool T, it is preferable to reduce the movement speed of the shutter 7 in order to blow the gas onto the shank portion for a longer period of time. Therefore, the movement speed of the shutter 7 can be set slower for a high-precision tool T as compared with a standard tool T.

The input device 63 can include, for example, a mouse, keyboard, mechanical buttons, etc., and the display device 64 can include, for example, a liquid crystal display or an organic EL (Electro-Luminescence) display. A touch panel may be used as the input device 63 and the display device 64. The interface 65 can include an interface circuit for connecting the machine controller 60 with external devices.

The NC device 70 is configured so as to control the X-axis drive device 12, the Y-axis drive device 13, the Z-axis drive device 11, and the spindle 5 described above based on the NC program. The NC device 70, like the machine controller 60, can include constituent elements such as, for example, a processor, memory, an input device, a display device, and an interface. The machine controller 60 and the NC device 70 may be capable of communicating with each other, and can collaborate when necessary.

Next, the tool exchange motions of the machine tool 100 will be described. During the following tool exchange motions, the processor 61 determines whether or not the shutter 7 has reached the predetermined positions Ss1 to Ss5 while referencing the memory 62, and controls the motion of the arm 53 in association with the position of the shutter 7 in accordance with the program stored in the memory 62.

Referring to FIG. 2, first, the processor 61 of the machine controller 60 sends a signal to the drive device of the tool magazine 51, and the tool magazine 51 moves the desired tool T2 to the selection position S1. As a result, the shifter 52 holds the tool pot P holding the tool T2. Thereafter, the processor 61 sends a signal to the drive device of the shifter 52, and the shifter 52 rotates from the selection position S1 to the secondary tool standby position S2. Referring to FIG. 6, at this time, a long tool T1 is attached to the spindle 5 and a short tool T2 is in the secondary tool standby position S2. The shutter 7 is positioned in the fully closed position Ss0.

Referring to FIG. 7, the processor 61 sends a signal to the first motor SV1, and movement of the shutter 7 from the fully closed position Ss0 to the fully open position Ss4 starts. The shutter 7 reaches the first predetermined position Ss1.

Referring to FIG. 8, when the processor 61 determines that the shutter 7 has reached the first predetermined position Ss1 stored in the memory 62 based on the signal from the encoder EN1, the processor 61 sends a signal to the second motor SV2, and the arm 53 rotates from the arm standby position Sr2 to the tool engagement position Sr1 (refer to the right side of FIG. 8).

Referring to FIG. 9, thereafter, the shutter 7 continues to move toward the fully open position Ss4, and the shutter 7 reaches the second predetermined position Ss2. When the processor 61 determines that the shutter 7 has reached the second predetermined position Ss2 stored in the memory 62 based on the signal from the encoder EN1, the processor 61 sends a signal to the third motor SV3, and the arm 53 translates from the retreat position St2 to the forward position St1. As a result, the tool T1 is removed from the spindle 5, and the tool T2 is removed from the tool pot P in the secondary tool standby position S2.

Referring to FIG. 10, the shutter 7 then continues to move toward the fully open position Ss4, and the shutter 7 reaches the third predetermined position Ss3.

Referring to FIG. 11, when the processor 61 determines that the shutter 7 has reached the third predetermined position Ss3 stored in the memory 62 based on the signal from the encoder EN1, the processor 61 sends a signal to the second motor SV2, and the arm 53 rotates by 180° toward the tool engagement position Sr1 on the opposite side. As a result, the long tool T1 moves to the secondary tool standby position S2 side and the short tool T2 moves to the spindle 5 side. Furthermore, the processor 61 sends a signal to the blower 8, and gas is blown onto the shank portion of the tool T2.

Figure 12:
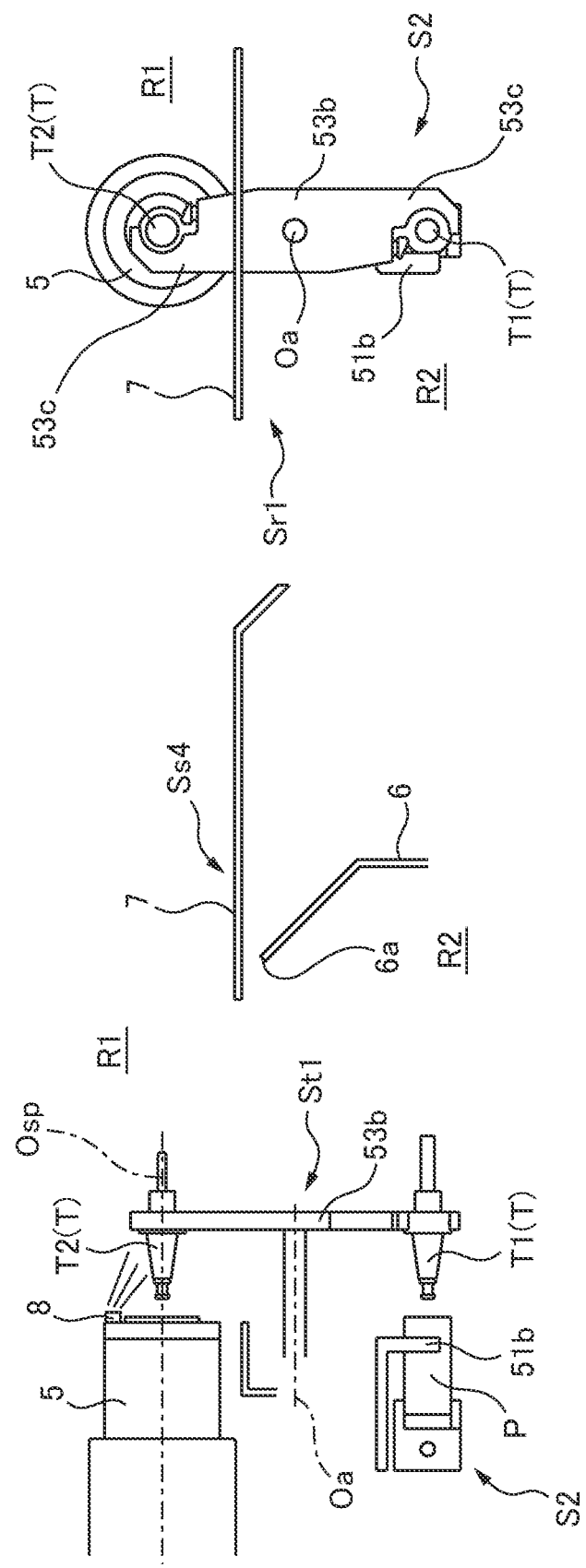
FIG. 12 is a schematic view showing motion of the shutter and the arm.

Referring to FIG. 12, the shutter 7 then continues to move toward the fully open position Ss4, and the shutter 7 reaches the fully open position Ss4.

Figure 13:
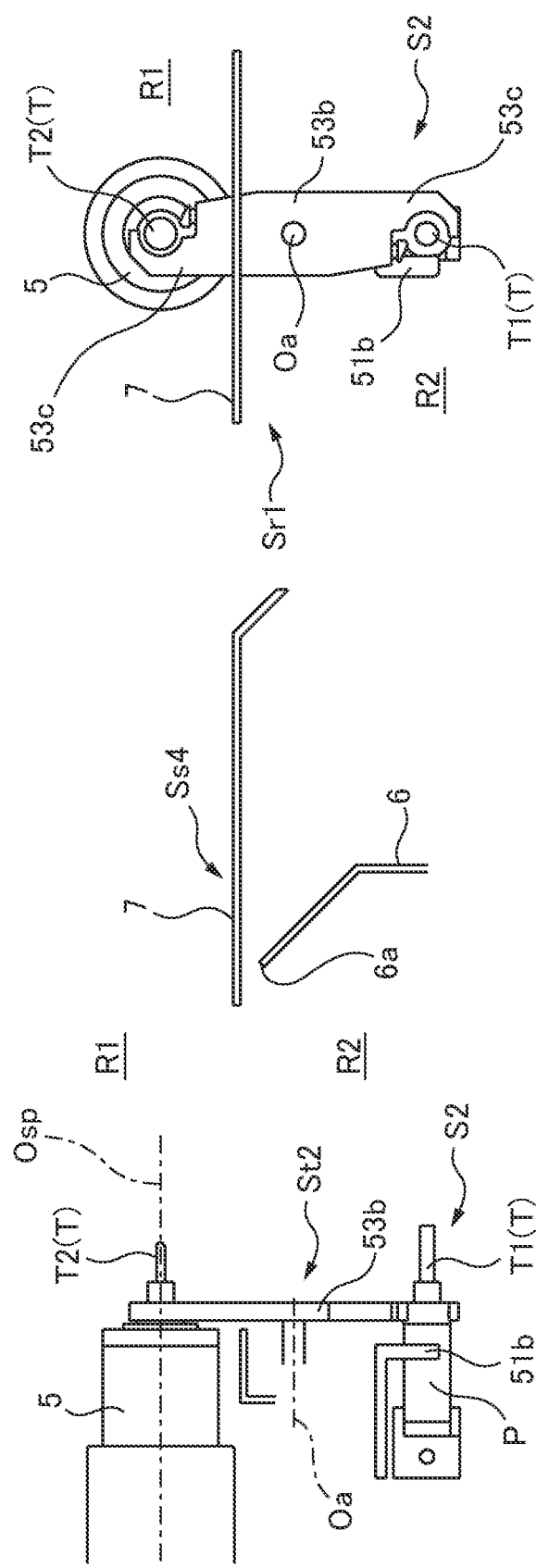
FIG. 13 is a schematic view showing motion of the shutter and the arm.

Referring to FIG. 13, when the processor 61 determines that the shutter 7 has reached the fully open position Ss4 stored in the memory 62 based on the signal from the encoder EN1, the processor 61 sends a signal to the third motor SV3, and the arm 53 moves from the forward position St1 to the retreat position St2. As a result, the long tool T1 is inserted into the tool pot P held in the secondary tool standby position S2, and the short tool T2 is attached to the spindle 5. Furthermore, the processor 61 sends a signal to the blower 8, and the blower 8 stops.

Referring to FIG. 14, when the processor 61 determines that the arm 53 has moved from the forward position St1 to the retreat position St2 based on the signal from the encoder EN3, the processor 61 sends a signal to the first motor SV1, and the shutter 7 starts to move from the fully open position Ss4 toward the fully closed position Ss0.

Referring to FIG. 15, the shutter 7 reaches the fifth predetermined position Ss5. When the processor 61 determines that the shutter 7 has reached the fifth predetermined position Ss5 stored in the memory 62 based on the signal from the encoder EN1, the processor 61 confirms that the rotation of the arm 53 from the tool engagement position Sr1 to the arm standby position Sr2 has completed (refer to the right drawing of FIG. 15). When the rotation has not completed, movement of the shutter stops.

Figure 16:
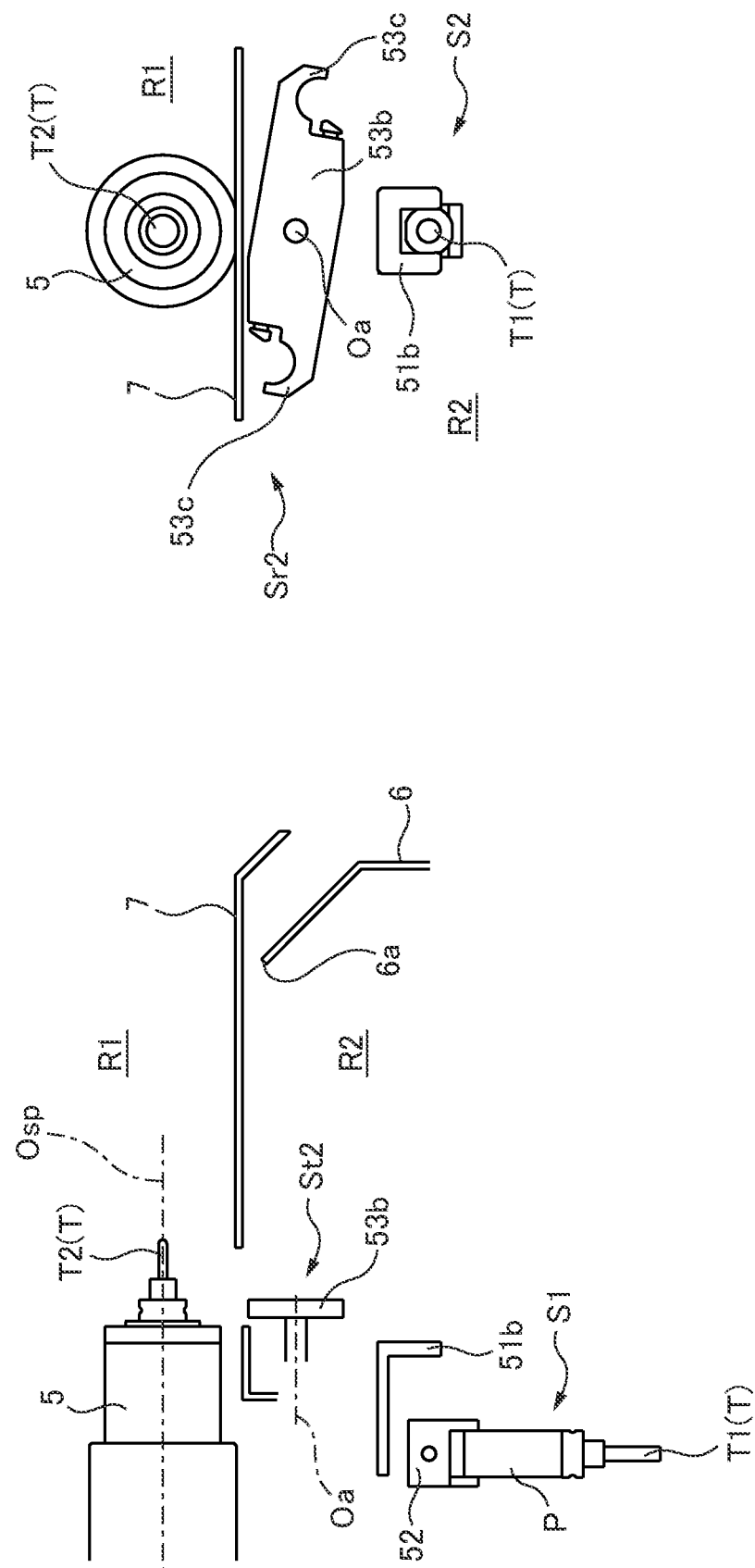
FIG. 16 is a schematic view showing motion of the shutter and the arm.

Referring to FIG. 16, after the arm 53 has rotated to the arm standby position Sr2, the processor 61 sends a signal to the shifter 52, and the shifter 52 rotates from the secondary tool standby position S2 to the selection position S1 (refer to the left drawing of FIG. 16). As a result, the tool T1 is returned to the tool magazine 51. Furthermore, thereafter, the shutter 7 continues to move toward the fully closed position Ss0.

Referring to FIG. 17, the shutter 7 reaches the fully closed position Ss0, and the series of tool exchange motions ends.

As described above, in the machine tool 100 according to the embodiment, the motion of the arm 53 is executed based on the position of the shutter 7 detected by the encoder EN1 and the predetermined positions Ss1 to Ss5 of the shutter 7 associated with the motion of the arm 53 and stored in the memory 62. Since the encoder EN1 can detect the position of the shutter 7 in the entire range between the fully open position Ss4 and the fully closed position Ss0, by adjusting the stored positions of the shutter 7, the timing of the execution of the motion of the arm 53 can be adjusted. Thus, the timing at which the motion of the arm 53 is executed can be optimized in association with the motion of the shutter 7, whereby the tool exchange time can be shortened.

Furthermore, in the machine tool 100 according to the embodiment, the arm 53 can rotate between the tool engagement position Sr1 for engaging the tool T mounted on the spindle 5 and the tool T in the secondary tool standby position S2 and the arm standby position Sr2 for standby of the arm 53, and can translate along the axis of rotation Oa of the arm 53 between the forward position St1 for removing the tool T from the spindle 5 and the retreat position St2 for engaging the tool T with the spindle 5, the machine tool 100 comprises the second motor SV2 for rotating the arm 53 and the third motor SV3 for translating the arm 53, and the machine controller 60 controls at least one of the second motor SV2 and the third motor SV3 so as to control at least one of the rotational motion and translation motion of the arm 53 based on the position of the shutter 7 detected by the encoder EN1 and the predetermined positions Ss1 to Ss5 of the shutter 7 stored in the memory 62. Thus, since the rotation and translation of the arm 53 are operated separately by the second motor SV2 and the third motor SV3, respectively, the motion of the arm 53 can be more finely adjusted.

Furthermore, in the machine tool 100 according to the embodiment, the machine controller 60 controls the second motor SV2 so as to rotate the arm 53 from the arm standby position Sr2 to the tool engagement position Sr1 when the encoder EN1 detects that the shutter 7 has moved from the fully closed position Ss0 to the predetermined position Ss1 (refer to the left drawings of FIGS. 7 and 8). Thus, since the arm 53 also rotates while the shutter 7 is open, the rotational motion of the arm 53 can be more quickly ended.

Furthermore, the machine tool 100 according to the embodiment comprises the encoder EN3 which is capable of detecting the translational position of the arm 53 in the entire range between the forward position St1 and the retreat position St2, the machine controller 60 controls the first motor SV1 so that the shutter 7 starts to move from the fully open position Ss4 to the fully closed position Ss0 when the encoder EN3 detects that the arm 53 has moved from the forward position St1 to the retreat position St2 (refer to the left drawing of FIG. 13), and controls the second motor SV2 so that the arm 53 starts to rotate from the tool engagement position Sr1 to the arm standby position Sr2 (refer to the right drawing of FIG. 15) when the encoder EN1 detects that the shutter 7 has moved from the fully open position Ss4 to the predetermined position Ss5 (refer to the left drawing of FIG. 15). Thus, since when the arm 53 moves to the retreat position St2 (i.e., the tool T is attached to the spindle 5), the shutter 7 starts to close, and the arm 53 also rotates simultaneously while the shutter 7 is closed, the rotational motion of the arm 53 can be more quickly ended.

Though the embodiment of the machine tool has been described, the present invention is not limited to the embodiment described above. A person skilled in the art would understand that various modifications can be made to the embodiment described above.

For example, in the above embodiment, after the long tool T1 is moved to the secondary tool standby position S2 side and the short tool T2 is moved to the spindle 5 side (refer to the left drawing of FIG. 11), the arm 53 moves to the fully open position Ss4 (refer to the left drawing of FIG. 12). However, in another embodiment, the arm 53 may stop translation at the third position Ss3 (refer to the left drawing of FIG. 11), and may not move to the fully open position Ss4. In this case, the stop position Ss3 of the arm 53 changes in accordance with the length of the tool T, and the memory 62 stores the stop position Ss3 of the arm 53 in accordance with the length of the tool T.

REFERENCE SIGNS LIST

5 Spindle
6 Splashguard (Wall Partitioning Machining Chamber And Tool Holding Chamber)
6a Opening
7 Shutter
53 Arm
60 Machine Controller (Controller)
61 Processor
62 Memory
100 Machine Tool
EN1 Encoder (Shutter Position Detector)
EN2 Encoder (Arm Rotational Position Detector)
EN3 Encoder (Arm Translational Position Detector)
Oa Axis of Rotation of Arm
R1 Machining Chamber
R2 Tool Holding Chamber
S2 Secondary Tool Standby Position
Sr1 Tool Engagement Position
Sr2 Arm Standby Position
Ss1 to Ss5 Predetermined Positions Of Shutter
St1 Forward Position
St2 Retreat Position
SV1 First Motor
SV2 Second Motor
SV3 Third Motor
T, T1, T2 Tool

The invention claimed is:

1. A machine tool which machines a workpiece in a machining chamber using a tool selected from a plurality of tools held in a tool holding chamber, the machine tool comprising:
   an arm for exchanging the tool between a spindle in the machining chamber and a secondary tool standby position in the tool holding chamber,
   a shutter provided in an opening defined in a wall partitioning the machining chamber and the tool holding chamber, the shutter being movable between a fully open position and a fully closed position,
   a first motor for opening and closing the shutter,
   a shutter position detector which is capable of detecting a position of the shutter over an entire range between the fully open position and the fully closed position,
   a storage device in which predetermined positions of the shutter are stored in association with predetermined motions of the arm, and
   a controller which is configured to execute the predetermined motions of the arm based on the position of the shutter detected by the shutter position detector and based on the predetermined positions of the shutter stored in the storage device, wherein
   the controller is programmed to execute a predetermined motion of the arm in which the arm incurs rotational motion about a rotation axis, which rotational motion is from an arm standby position to a tool engagement position when the shutter position detector detects that the shutter has moved from the fully closed position to a first predetermined position of the predetermined positions at which the shutter is partially opened, and
   the controller is programmed to execute a predetermined motion of the arm in which the arm incurs translational motion from a retreat position to a forward position in a direction that extends parallel to the rotation axis of the arm when the shutter position detector detects that the shutter has moved from the first predetermined position into a second predetermined position of the predetermined positions at which the shutter is further opened than when the shutter is disposed in the first predetermined position.

2. The machine tool according to claim 1, wherein
   the arm is rotatable between the tool engagement position for engaging with a tool mounted on the spindle and a tool in the secondary tool standby position and the arm standby position for standby of the arm, the arm is translatable along the rotation axis of the arm between the forward position for removing the tool from the spindle and the retreat position for engaging the tool with the spindle, the machine tool further comprises:
- a second motor for rotating the arm about the rotation axis, and
- a third motor for translating the arm in the direction that extends parallel to the rotation axis of the arm, and the controller controls at least one of the second motor and the third motor so as to control at least one of rotational motion and translational motion of the arm based on the position of the shutter detected by the shutter position detector and the predetermined positions of the shutter stored in the storage device.

3. The machine tool according to claim 2, wherein the controller controls the second motor so as to rotate the arm from the arm standby position to the tool engagement position when the shutter position detector detects that the shutter has moved from the fully closed position to the first predetermined position.

4. The machine tool according to claim 3, wherein the controller first completes rotational motion of the arm from the arm standby position to the tool engagement position by the second motor when the spindle moves to a position for tool exchange, and engages the tool held in the spindle with the arm in accordance with movement of the spindle.

5. The machine tool according to claim 2, further comprising:
an arm translational position detector which can detect a translational position of the arm in an entire range between the forward position and the retreat position, wherein the predetermined positions of the shutter stored in the storage device include third, fourth, and fifth predetermined positions of the shutter, and the controller:
- controls the first motor so that the shutter starts to move from the fully open position to the fully closed position when the arm translational position detector detects that the arm has begun to move from the forward position to the retreat position,
- confirms whether rotation of the arm from the tool engagement position to the arm standby position has completed when the shutter position detector detects that the shutter has moved from the fully open position to the fifth predetermined position, and
- controls so as to stop movement of the shutter when the rotation has not completed.

6. The machine tool according to claim 2, further comprising:

a blower for blowing a gas onto a shank portion of the tool held by the arm when the arm is incurring translational motion, wherein the storage device stores whether each tool is a standard tool or a precision tool, and in the case in which the tool mounted on the spindle is a precision tool, when the arm incurs translational motion, the controller reduces a translational speed of the arm to be made lower than that when the tool is a standard tool or reciprocates the arm multiple times to extend the time in which the gas is blown.

* * * * *